(12) United States Patent
Bish et al.

(10) Patent No.: US 10,929,242 B2
(45) Date of Patent: *Feb. 23, 2021

(54) FILE CORRUPTION RECOVERY IN CONCURRENT DATA PROTECTION

(71) Applicant: International Business Machines Corporation, Armonk, NY (US)

(72) Inventors: Thomas W. Bish, Tucson, AZ (US); Kenneth W. Boyd, Tucson, AZ (US); Gregory E. McBride, Vail, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/378,673

(22) Filed: Apr. 9, 2019

(65) Prior Publication Data

US 2019/0235963 A1 Aug. 1, 2019

Related U.S. Application Data

(63) Continuation of application No. 15/797,322, filed on Oct. 30, 2017, now Pat. No. 10,353,781, which is a
(Continued)

(51) Int. Cl.
*G06F 11/00* (2006.01)
*G06F 11/14* (2006.01)

(52) U.S. Cl.
CPC ...... *G06F 11/1451* (2013.01); *G06F 11/1471* (2013.01); *G06F 11/1448* (2013.01)

(58) Field of Classification Search
CPC ............. G06F 11/1402; G06F 11/1469; G06F 11/142; G06F 11/1423; G06F 11/1425;
(Continued)

(56) References Cited

U.S. PATENT DOCUMENTS

| 6,000,053 A | 12/1999 | Levine |
| 6,173,291 B1 | 1/2001 | Jenevein |

(Continued)

FOREIGN PATENT DOCUMENTS

| EP | 2234304 A1 | 9/2010 |
| WO | 2009067306 A1 | 5/2009 |
| WO | 2015004502 A1 | 1/2015 |

OTHER PUBLICATIONS

"Data Protection: Understanding the Benefits of Various Data Backup and Recovery Techniques", Storage and File Area Network, White Paper, Brocade, pp. 1-12, © 2007 Brocade Communications Systems, Inc.

*Primary Examiner* — Sarai E Butler
(74) *Attorney, Agent, or Firm* — David B. Woycechowsky (57) ABSTRACT

An incremental backup system that performs the following (not necessarily in the following order): (i) making a plurality of time-ordered journal entries; (ii) determining that a corruption condition exists; (iii) responsive to a corruption condition, constructing a first incremental mirror data set that reflects a backup data set and all journal entries up to a first corrupted journal entry which is the earliest in time journal entry, of the plurality of journal entries, that is a corrupted journal entry; (iv) responsive to a corruption condition, constructing a second incremental mirror data set that reflects the backup data set and all journal entries up to the first corrupted journal entry; and (v) checking for corruption in the first and second incremental mirror data sets to determine the latest uncorrupted version of the data set.

6 Claims, 7 Drawing Sheets

Related U.S. Application Data continuation of application No. 14/837,255, filed on Aug. 27, 2015, now Pat. No. 9,928,145, which is a continuation of application No. 14/139,906, filed on Dec. 24, 2013, now Pat. No. 9,158,633.

(58) Field of Classification Search
CPC ...... G06F 11/16; G06F 11/20; G06F 11/2005; G06F 11/2007; G06F 11/202; G06F 11/2023; G06F 11/2092
USPC .......................................................... 714/19
See application file for complete search history.

(56) References Cited

U.S. PATENT DOCUMENTS

| | | |
|---|---|---|
| 6,314,433 B1 | 11/2001 | Mills |
| 7,848,521 B2 | 12/2010 | Leporini |
| 8,271,852 B2 | 9/2012 | Kirkby |
| 9,158,633 B2 | 10/2015 | Bish |
| 2005/0262097 A1 | 11/2005 | Sim-Tang |
| 2006/0095405 A1* | 5/2006 | Anderson ............... G06F 16/22 |
| 2006/0150015 A1* | 7/2006 | Kondajeri ........... G06F 11/3055 |
| | | 714/23 |
| 2006/0259949 A1 | 11/2006 | Schaefer |
| 2007/0220321 A1* | 9/2007 | Iqbal .................... G06F 11/1461 |
| | | 714/13 |
| 2007/0266062 A1* | 11/2007 | Young ..................... G06F 16/27 |
| 2008/0229142 A1* | 9/2008 | Anand ................ G06F 11/1469 |
| | | 714/6.12 |
| 2008/0229429 A1 | 9/2008 | Krig |
| 2009/0292966 A1 | 11/2009 | Liva |
| 2010/0031086 A1 | 2/2010 | Leppard |
| 2010/0077165 A1* | 3/2010 | Lu ....................... G06F 11/1451 |
| | | 711/162 |
| 2012/0311376 A1* | 12/2012 | Taranov .............. G06F 11/2097 |
| | | 714/4.11 |
| 2015/0370654 A1 | 12/2015 | Bish |
| 2018/0067814 A1 | 3/2018 | Bish |

\* cited by examiner

FILE CORRUPTION RECOVERY IN CONCURRENT DATA PROTECTION

BACKGROUND OF THE INVENTION

The present invention relates generally to the fields of recovering data when data corruption has occurred and finding corrupted data portions (for example, corrupted data blocks) when a larger set of data has become corrupted.

It is known to use a piece of software, such as a software "tool" to "backup" a set of data (for example, a set of files) on an ongoing basis over time. Conventionally, when a set of data (for example, one, or more, data files) is subject to change, then backup copying of the data set is accomplished by incrementally moving portions of copies of files whose data has changed from a primary file system to a backup file system. There are several well-known methods for performing this kind of incremental backup, such as the concurrent data protection (CDP) method. It is further known that a set of data, which is subject to backup by a backup tool, may become corrupted such that some, or all, of the data set becomes difficult, or impossible, to use.

SUMMARY

According to an aspect of the present invention, there is a method, system, and/or computer program product that performs the following actions (not necessarily in the following order): (i) making a plurality of time-ordered journal entries for incrementally backing up a dynamic source file as a backup data set; (ii) determining that a corruption condition exists; (iii) responsive to detection of the corruption condition, constructing a first incremental mirror data set that reflects the backup data set and all journal entries up to, but not including, a first corrupted journal entry which is the earliest in time journal entry, of the plurality of journal entries, that is a corrupted journal entry; (iv) responsive to detection of the corruption condition, constructing a second incremental mirror data set that reflects the backup data set and all journal entries up to, and including, the first corrupted journal entry; and (v) checking for corruption in the first and second incremental mirror data sets to determine that the first incremental mirror data set is a most up to data set which: (a) is uncorrupted, and (b) can be constructed from the backup data set and the plurality of time-ordered journal entries. At least the checking for corruption, set forth above, is performed by machine logic implemented by a machine.

DETAILED DESCRIPTION

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Figure 1:
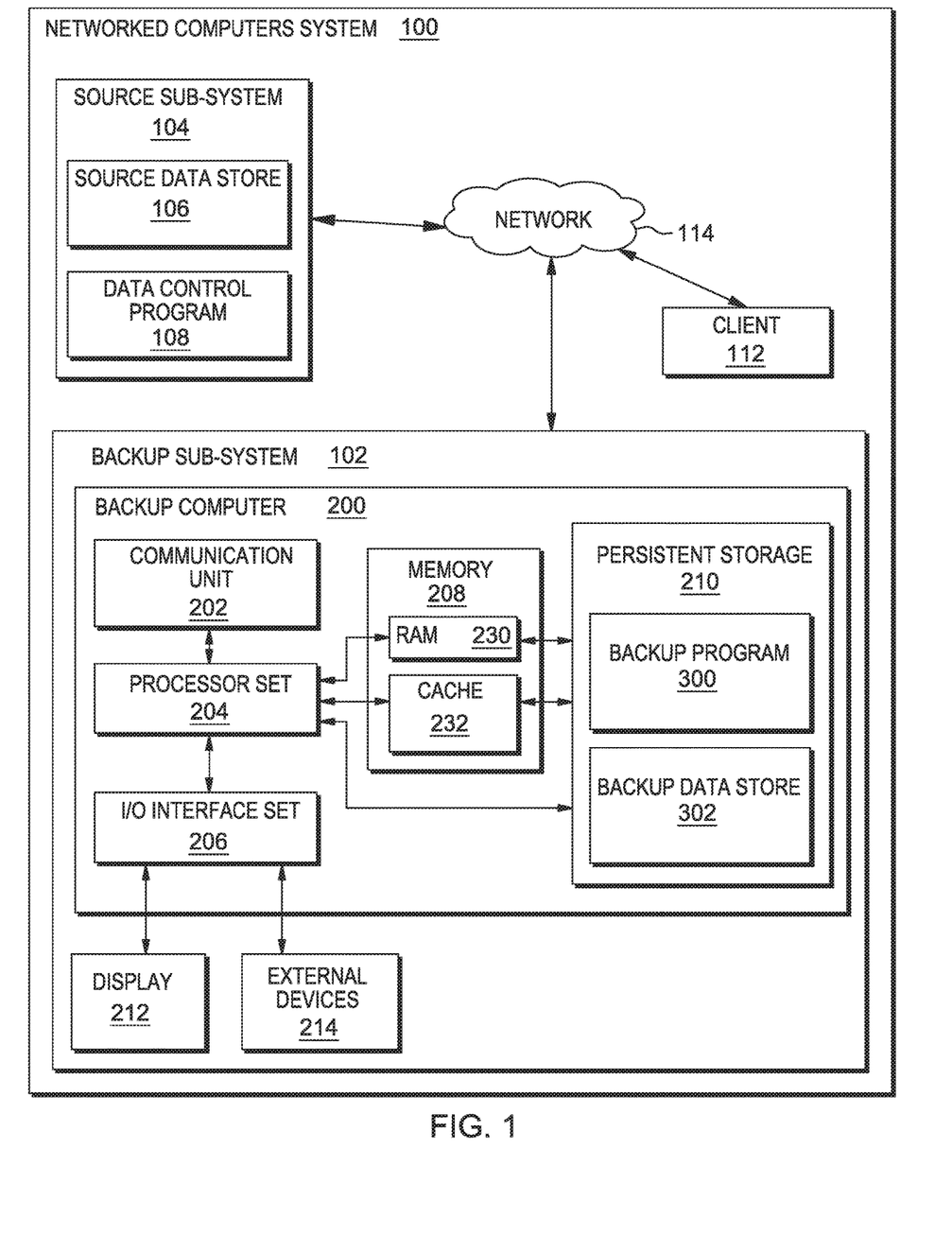
FIG. 1 is a schematic view of a first embodiment of a networked computers system according to the present invention.

An embodiment of a possible hardware and software environment for software and/or methods according to the present invention will now be described in detail with reference to FIG. 1, which is a functional block diagram illustrating various portions of networked computers system 100, including: backup sub-system 102; source sub-system 104; client 112; and communication network 114. Backup sub-system 102 includes: backup computer 200; communication unit 202; processor set 204; input/output (i/o) interface set 206; memory device 208; persistent storage device 210; display device 212; external device(s) 214; random access memory (RAM) devices 230; cache memory device 232; backup program 300; and backup data store 302. Backup data store 302 provides and/or stores the data needed by backup program 300 in its operations (which operations will be described in detail, below).

Backup sub-system 102 may be a mainframe computer, a laptop computer, a tablet computer, a netbook computer, a personal computer (PC), a desktop computer, a personal digital assistant (PDA), a smart phone, or any programmable electronic device capable of communicating with the client sub-systems via network 114. Backup Program 300 is a collection of machine-readable instructions and/or data that is used to create, manage, and control certain software functions that will be discussed in detail, below, in the Example Embodiment sub-section of this Detailed Description section.

Backup sub-system 102 is capable of communicating with other computer sub-systems (such as source sub-system 104 through network 114. Network 114 can be, for example, a local area network (LAN), a wide area network (WAN), such as the Internet, or a combination of the two, and can include wired, wireless, or fiber optic connections. In general, network 114 can be any combination of connections and protocols that will support communications between server and client sub-systems.

Backup sub-system 102 is shown as a block diagram with many double arrows. These double arrows (no separate reference numerals) represent a communications fabric, which provides communications between various components of backup sub-system 102. This communications fabric can be implemented with any architecture designed for passing data and/or control information between processors (such as microprocessors, communications, and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 supply memory for backup sub-system 102; and/or (ii) devices external to backup sub-system 102 may be able to provide memory for backup sub-system 102.

Backup program 300 is stored in persistent storage 210 for access and/or execution by one or more of the respective processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Backup program 300 may include both machine-readable and performable instructions and/or substantive data (that is, the type of data stored in a database). In this particular embodiment, persistent storage 210 includes a magnetic hard disk drive. To name some possible variations, persistent storage 210 may include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to backup sub-system 102, such as source sub-system 104. In these examples, communication unit 202 includes one or more network interface cards. Communication unit 202 may provide communications through the use of either or both physical and wireless communications links. Any software modules discussed herein may be downloaded to a persistent storage device (such as persistent storage 210) through a communications unit (such as communication unit 202).

I/O interface set 206 allows for input and output of data with other devices that may be connected locally in data communication with backup computer 200. For example, I/O interface set 206 provides a connection to external device(s) 214. External device(s) 214 will typically include devices such as a keyboard, a keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, backup program 300, can be stored on such portable computer-readable storage media. In these embodiments, the relevant software may (or may not) be loaded, in whole or in part, onto persistent storage 210 via I/O interface set 206. I/O interface set 206 also connects in data communication with display 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

II. Example Embodiment

Preliminary note: The flowchart and block diagrams in the following Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
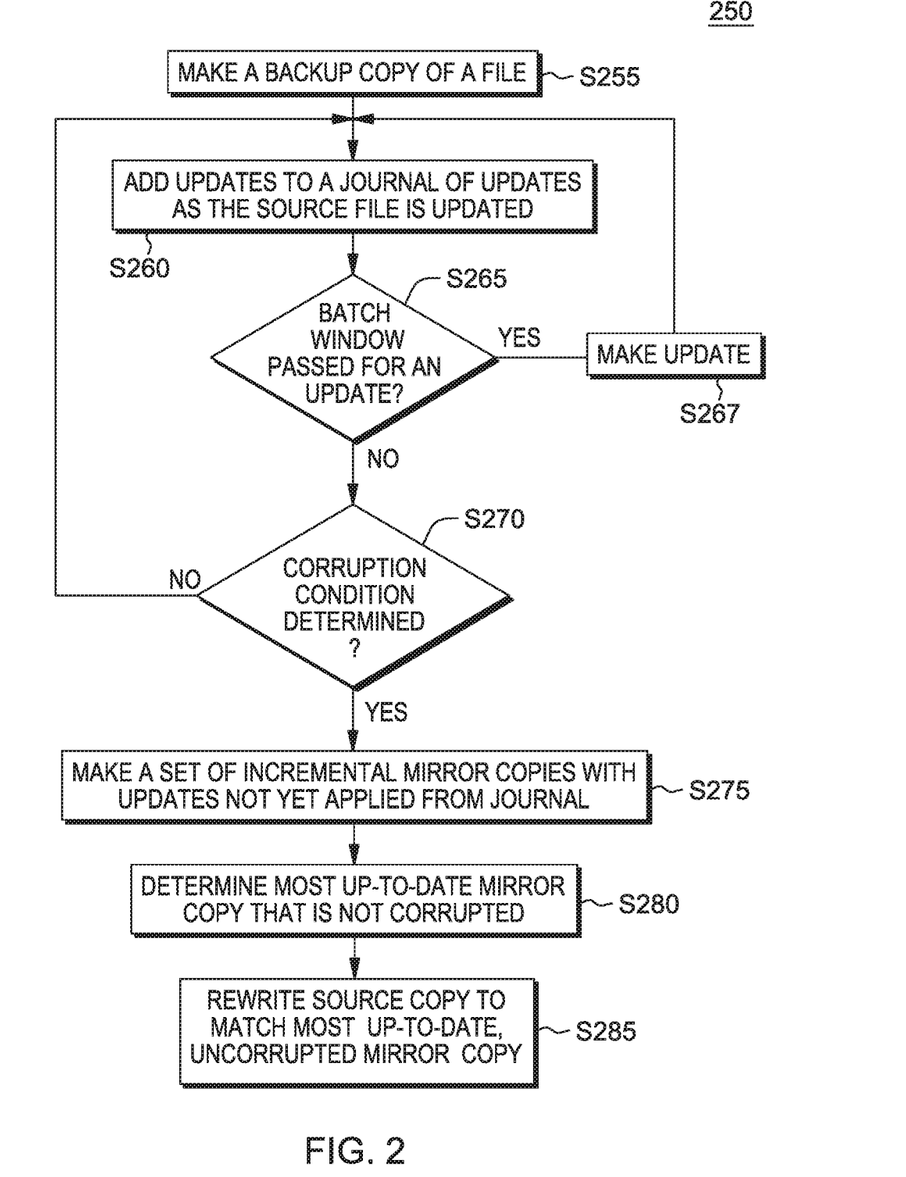
FIG. 2 is a flowchart showing a method performed, at least in part, by the first embodiment system.
Figure 3:
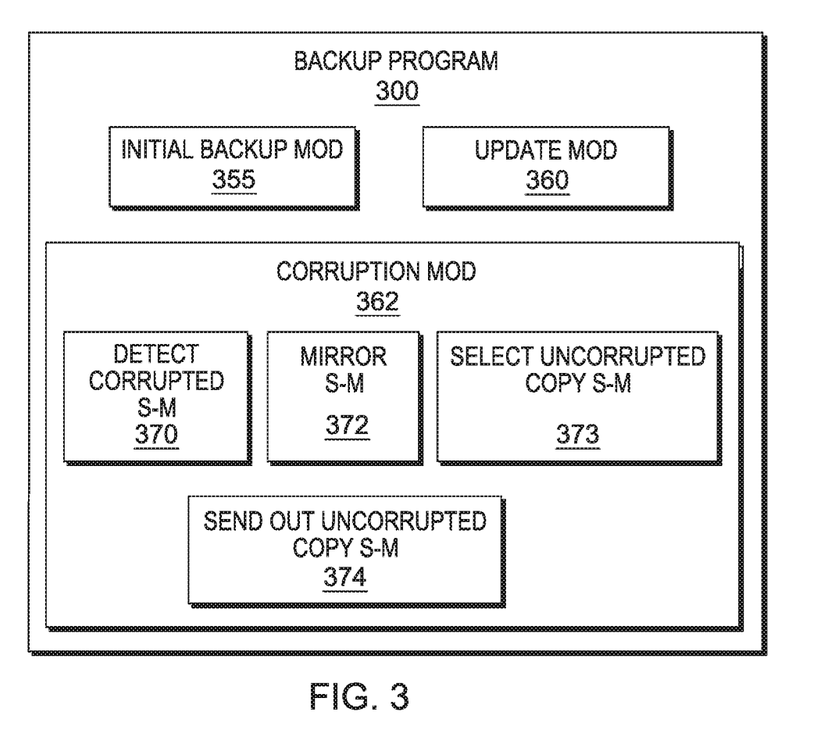
FIG. 3 is a schematic view of a software portion of the first embodiment computer system.

FIG. 2 shows a flow chart 250 depicting a method according to the present invention. FIG. 3 shows backup program 300 for performing at least some of the method steps of flow chart 250. This method and associated software will now be discussed, over the course of the following paragraphs, with extensive reference to FIG. 2 (for the method step blocks) and FIG. 3 (for the software blocks).

The method of flow chart 250 is applicable to an incremental backup system that uses journaling to make incremental changes so that a backup data set (stored in backup data store 302 (see FIG. 1)) will track a dynamic source data set (stored in source data store 106 (see FIG. 1 and definition of "dynamic data set", below in the Definitions sub-section) under control of data control program 108 and backup program 300, working in co-operation through network 114. As is conventional, each incremental change from source data is intentionally delayed before being implemented in the backup data set of backup data store 302, and the amount of time of this delay is called a "batch window." As is further conventional during the time of the batch window, each incremental change to be applied to the backup data set is stored as a journal entry in a journal.

Processing begins at step S255, where initial backup module ("mod") 355 makes the initial version of the backup data set, which will, at its inception, match the source data set.

Processing proceeds to step S260, where update mod 360: (i) receives source file updates from data control program 108 through network 114 (see FIG. 1); (ii) puts each update in a journal (not separately shown); and (iii) keeps track of a batch window for each update in the journal.

Processing proceeds intermittently to step S265 where mod 355 checks to determine whether any of the existing journal entry updates have been in the journal for a long enough time such that their batch window has expired. If a journal entry is at its batch window time, then processing proceeds to step S267 where mod 355 makes the update for that journal entry in the backup data set. It is noted that step S267 updates the backup file (on a batch window delayed basis) and does not update the source file (which has already been subject to the update being made at step S267). As will be discussed in detail below, in some embodiments of the present invention, a journal entry that is about to be applied will be checked for "bad signatures" (see definition, below) before that journal entry is actually applied to the backup data set. Alternatively, a journal entry can be checked for bad signatures: (i) before it is added to the journal, or (ii) during its batch window. A journal entry with a bad signature: (i) will not be implemented to update the backup data set; and (ii) may have further actions taken to check and/or fix the source data set.

When it is determined that no update is to be made to the batch file, processing proceeds to step S270, where detect corrupted sub-mod 370 of corruption mod 362 determines whether a corruption condition exists. A couple examples of corruption condition are: (i) a human user of the source data set suspects that the source data set has become corrupt and alerts the control software of the backup system (that is, program 300); or (ii) corruption is detected (or found to be likely at least) automatically by software. If no corruption condition is determined at step S270, then processing loops back to step S260.

In response to a corruption condition, processing proceeds to step S275, where mirror sub-mod 372 makes a set of "incremental mirror versions" of the backed up data set. Each incremental mirror version will include one, or more, of the updates corresponding to the updates currently in the journal. For mirror versions having more than one update, the updates that a given incremental mirror version will have will start from the earliest update in the journal and will also have some number of later updates (which updates are time-ordered in the journal). In this embodiment, mirror sub-mod 372 makes an incremental mirror version for every successive update, such that there is a mirror version corresponding to how the source data set was at the time each and every update was made to it. In other embodiments (and as will be discussed, below) it is possible to have embodiments where only a subset of all possible incremental mirror versions of the data set are made.

Processing proceeds to step S280, where select uncorrupted copy sub-mod 373 determines the most up-to-date incremental mirror version that is not corrupted. This uncorrupted, and most up-to-date, incremental mirror version is saved and sometimes referred to as the golden recovery data set. Corruption can be determined in many ways, including the following: (i) by a user when inspecting the file; (ii) by the system as it could know what corruptions bits look like and determine that this update has corrupted data; and/or (iii) by using anti-virus software to identify malicious data in files. Processing proceeds to step S285, where send out uncorrupted copy sub-mod 374 sends the golden recovery data set to data control program 108 over network 114 (see FIG. 1). Data control program 108 replaces the corrupted source data set with the golden recovery data set, which thereby becomes the new source data set. In this embodiment, the backup data set is not changed to match the golden recovery data set, but all journal entries are discarded, such that the journal will start fresh with only updates made to the source data set after the point in time that it is replaced with the golden recovery data set.

III. Further Comments and/or Embodiments

Some embodiments of the present invention recognize one, or more, of the following regarding currently conventional backup tools and/or methods: (i) with conventional backup processes, if a file is corrupted on the primary system, there is no method to stop the copy of the corrupted file to the backup file system; (ii) the foregoing item represents a lack of protection and can lead to the loss of files; (iii) if one makes multiple changes between successive backups, then only the version of the file that was present at the time of the point in time backup will be retained; (iv) if a successive backup timing interval is too long, then important changes may be lost; (v) if the successive backup timing interval is too short, then the resource requirements for performing backup operations can become burdensome and/or unduly interfere with other computer operations; and/or (vi) if a file is corrupted and the corrupted version of the file is backed up, then it will render the backup of the file worthless, and the file will require multiple other backups to be accessible to ensure the file can be restored to a working version.

Some embodiments of the present invention may include one, or more, of the following features, characteristics, and/or advantages: (i) provides a backup tool that can interface with a wide variety of other tools for providing known corruption patterns; (ii) provides a backup tool that will interface with anti-virus software for supplying known corruption signatures; (iii) if a journal entry is determined to have the corrupted signature, software will flag the file and suspend new writes; (iv) if a journal entry is determined to have the corrupted signature, software will alert the source file system that the file including that journal entry is corrupted; (v) provides a software-based tool for handling individual changes performed to a data set (for example, a file) over a period of time; (vi) allows a customer the ability to roll back to a version of the file as it existed up to the write that caused the file to be corrupted; (vii) tracks and maintains individual changes to files in the order they were made on a delayed mirror copy of the file and saves off these changes for a period of time (that is, the system can save the file in any data source (for example database, txt file, a journal in the file system), and the system needs to save the incremental changes so that the system will know all of the changes applied to the file for uncorrupted backups and/or source files; (viii) when a predetermined period of time has passed, the software tool will start to "play forward" the changes (the play forward action is the ability for the remote (DR) cluster to start to apply the incremental changes to the DR cluster in the order they were written on the source cluster); (ix) if a file is determined to be corrupted, a software tool will be able to restore changes made to the file by using the delayed mirror copy to roll the changes on the mirror up to the point of corruption; and/or (x) the delayed mirror copy is used to restore an original file to its previous state as it existed immediately prior to the corruption.

A "batch window" is the maximum time allowed for detection of, and restoration from, data corruption. For example, in common practice for CDP (concurrent data protection), the batch window is eight (8) hours. This would give the customer an eight (8) hour window to discover and repair the corrupted file(s) before having the corrupted file(s) copied to the backup system.

An embodiment of the present invention will now be discussed, which embodiment is implemented as a software-based backup tool in a disaster recovery (DR) scenario data storage system. In this DR embodiment, a "live" (or source) copy of the file is physically separate from the "remote" (or target) copy of the file, and the software-based backup tool includes pieces of code, at both the live and remote locations, working co-operatively to provide data backup according to methods that will be described, below. Other embodiments of the present invention may be implemented in a local environment. Various embodiments of this invention will work with a variety of data sets. The embodiment now under discussion is a single file system implementation.

The embodiment under discussion maintains two versions of the file system as follows: (i) a source data version (the "source filesystem"); and (ii) a backup version (the "backup file system"). In this embodiment, a user writes data to files in the source file system. A software-based backup tool has a form of journaling to track changes made to the files in the source file system. The backup file system is maintained by performing the same updates to the backup file system, but it will lag behind the source file system by the time specified by the batch window eight (8) hours in this embodiment now under discussion).

In the embodiment now under discussion, as the source file system gets updated, the source's journal will be updated, noting the time, data, and file updated. The backup tool will save this data and update the backup's journal. As updates continue to stream in, the backup tool will continue to note the updates and send the updated journal entries to the backup system.

Figure 4:
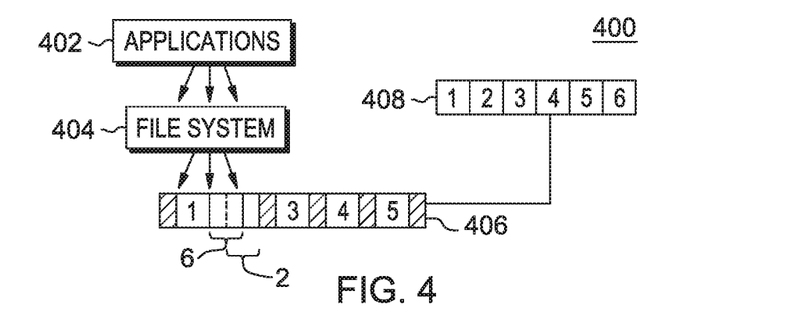
FIG. 4 is a diagram showing journaling and backup operations according to an embodiment of the present invention.

As shown in diagram 400 of FIG. 4, applications 402 write data to source file system 404, including first file 406, which includes updates 1, 2, 3, 4, 5, and 6. In diagram 400, update 6 has been written over part of update 2 to show that the system is not applying changes to the file that are past the point of corruption. This shows that the system is going to the end of the file, and then moving back to the last good known state of the file, and keeping this version of the file.

Each of these updates is journalled in first file journal 408. As will be appreciated by those of skill in the art, journaling the backbone of a journalled file system. It keeps the changes in this same ticker tape fashion in the file system so it can apply the changes to the file system and reduces the likelihood of corruption.

Figure 5A:
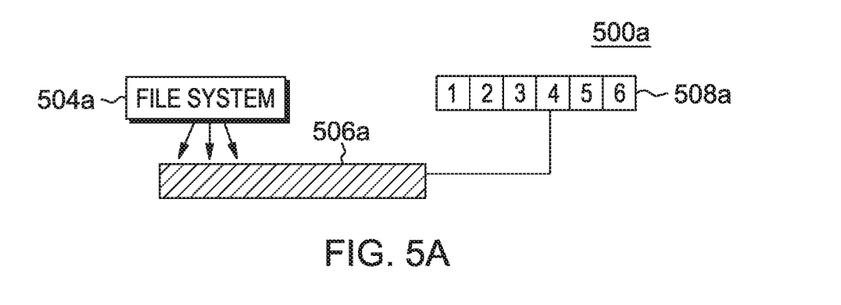
FIGS. 5A to 5E are further diagrams showing journaling and backup operations according to an embodiment of the present invention.

As shown in diagram 500a of FIG. 5A, at a first point in time, updates 1, 2, 3, 4, 5, and 6 have all been journalled in the backup file system 504a at journal 508a, but none of these updates have yet been made in the backup version of the first file 506a.

Figure 5B:
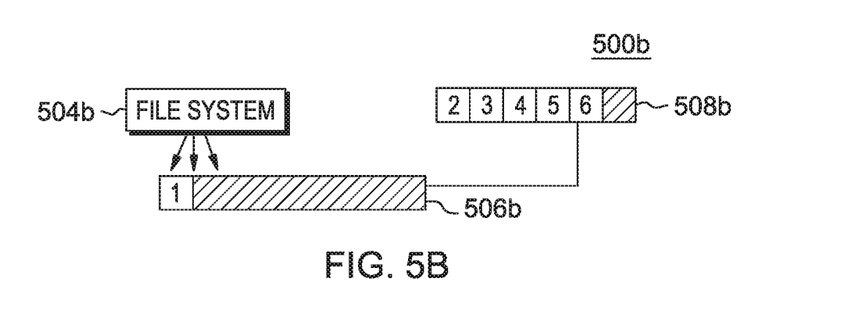

Once the batch window has passed for each update, the backup system will start to apply the changes to the backup file system, and the backup system will delete committed updates. "Delete committed updates" means that the system removes the update from the backup file system so that that change is committed to the file system and can no longer be reverted. This is shown in diagram 500b of FIG. 5B, representing a second point in time subsequent to the first point in time, where: (i) the backup version of the first file 506b of file system 504b has been updated to include update 1; and (ii) backup file system journal 508b has had update 1 deleted from it. However, update 1 is not made until the "batch window" interval (eight (8) hours, in this example) has passed.

Figure 5C:
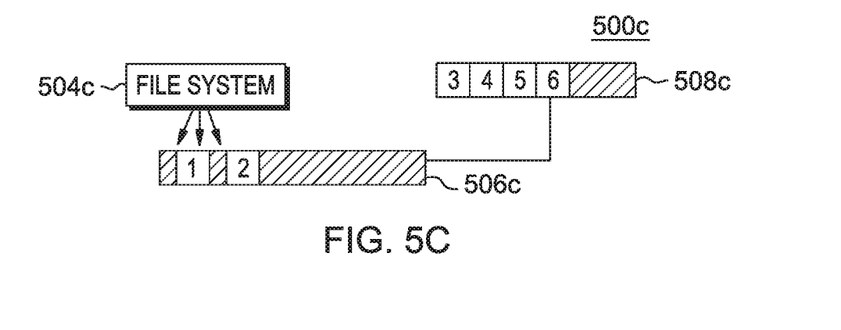

As shown in diagram 500c of FIG. 5C, representing a third point in time subsequent to the second point in time, file system 504c applies update 2 to the backup version of the first file 506c (and deletes it from journal 508c) after the batch window interval for update 2 expires. This process will continue as long as there are updates to the journal for the file.

When a customer identifies a file is corrupted, they will alert the system. The system will then suspend any new writes to the backup file until the corruption is resolved. The resolution process is as follows: (i) the customer will identify the file in question; and (ii) the system will make a recovery copy(ies) of various version(s) of the first file as will be explained below in connection with FIG. 5D (representing a fourth point in time subsequent to the third point in time). The recover copy(ies) may be made to a flash memory and represent "snapshot version(s)" of the first file.

Figure 5D:
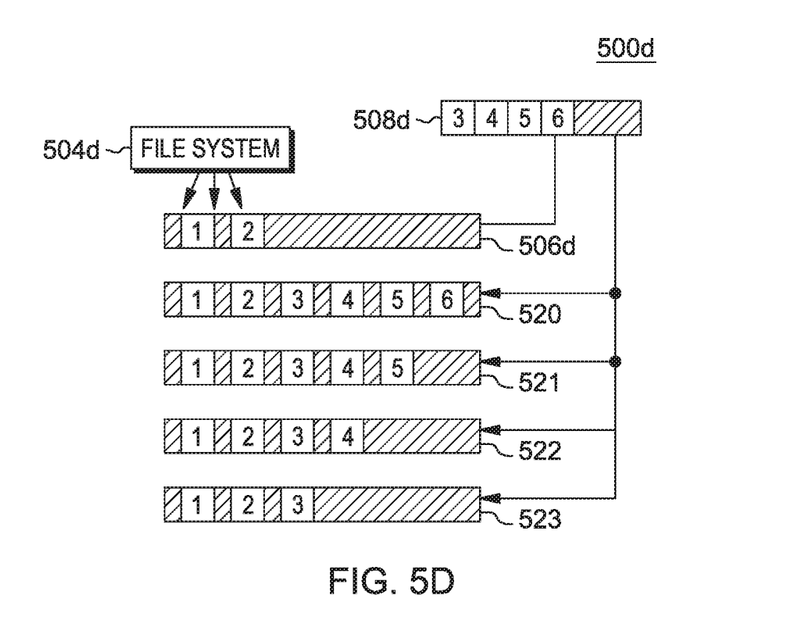

As shown in diagram 500d of FIG. 5D, upon notification that corruption has been observed and/or is suspected, file system 504d uses the updates of journal 508d to: (i) makes a first recovery copy (see FIG. 5D at reference numeral 520) with all updates remaining in the journal and determines whether that recovery copy is corrupted; (ii) if the first recovery copy 520 is corrupted, then a second recovery copy 521 is made with all the updates, excepting the most recent update, and it is determined whether the second recovery copy is corrupted; and (iii) so on in like manner (see FIG. 5D at reference numerals 522 and 523) until it is determined that a recovery copy iteration is not corrupted (in this example, this is recovery copy 523). The order of examining the mirror versions, for the purpose of determining where the corruption exists, can be up to the implementation. As will be appreciated by those of skill in the art, search algorithms for sorting and finding a specific data point are well known.

In this example, the uncorrupted recovery copy 523 is then used: (i) as the backup copy of the first file (see FIG. 5E at reference numeral 506e of diagram 500e, which replaces backup copy 506d of diagram 500d); and (ii) as a basis for returning the source file system to an uncorrupted state.

There are other ways of determining the most recent uncorrupted update than that explained above in connection with FIG. 5D. For example, there will be cases where there are numerous updates to a file, meaning that many possible recovery files could be made and tested for corruption. For instance, if the file that is corrupted is a DB file, and has thousands of transactions against the file, some embodiments of the present invention will use a binary search to determine where the point of corruption is. That is, the first recovery file to be tested will include half of the updates, so that it is known whether the corruption occurred in the first half of the updates, or the last half of the updates. If it is determined that the corruption did not occur until somewhere in the last half of updates, then a new recovery file with 75% of the updates will be generated and tested. Assume that this second recovery file is corrupt—this means that a third recover file with 62.5% of the updates will be made and tested—and so on until the most recent uncorrupted update is found to be used for data restoration purposes.

Figure 5E:
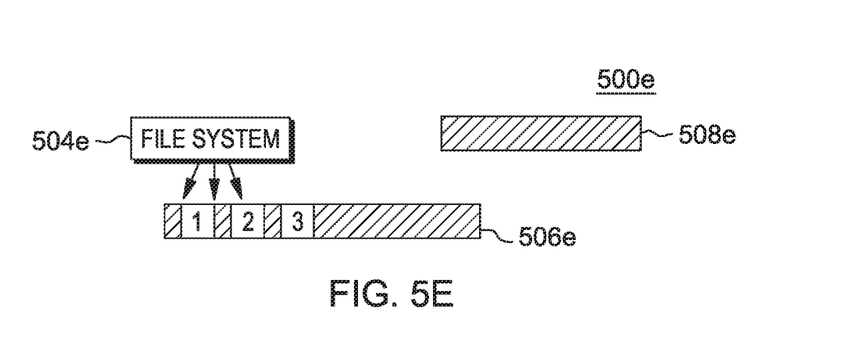

In diagram 500e of FIG. 5E, the backup version of the first file 506e is made (by file system 504e) to match the most recent uncorrupted recovery file (also called the "golden recovery file", see FIG. 5D at recovery file 523), and all updates are discarded from the backup system journal 508e at the time the golden recovery file is discarded. Two alternative methods for handling the backup version of the first file, after recovery of the source file system from the golden recovery file, will now be respectively discussed in the following two paragraphs. These two alternative methods will be discussed with reference to diagram 600 of FIG. 6. In diagram 600, the source file system is making updates. The x-axis is time. The backup file system shows how the file is updated with the batch window time lag. At the point where the corruption is identified, the backup file system creates the base copy of the file as described above. It creates a copy of the file that is uncorrupted and moves the file to the source file system. In the backup file system, there are the unusable updates as indicated in the key in FIG. 6. Those are the updates that are considered unusable because they are found after the corruption, and the two alternative methods, to be respectively described in the next two paragraphs, describe as to how they will be handled.

Figure 6:
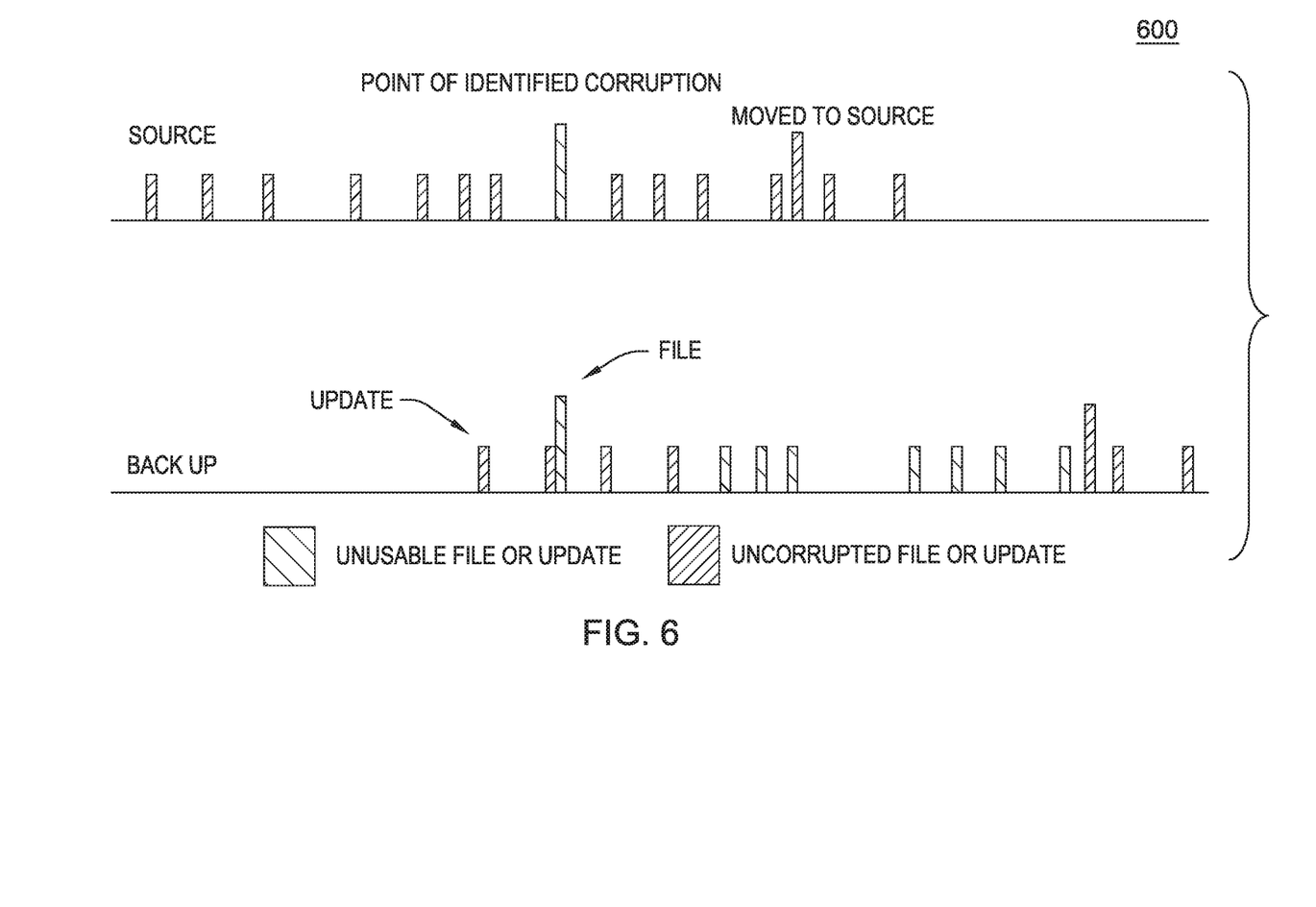
FIG. 6 is a further diagram showing journaling and backup operations according to an embodiment of the present invention.

The first alternative method will not keep the copy of the uncorrupted file that was copied to the source file system (golden recovery file) on the backup file system after moving the file to the source file system. It will continue to make updates to the backup version of the file up to the point of corruption, which will result in the backup version of the copy matching the golden recovery file. From here, it will not apply any new updates to the backup file until the journal entry that represents the copy to the source. After this entry is applied, it will again start updating the backup file.

The second alternative method will keep a copy of the golden recovery file accessible on the backup file system after the file has been copied to the source file system. It will continue to apply all updates to the backup file. Once the entry that holds the golden recovery file is applied to the backup system, the system will delete the copy of the golden recovery file on the backup system and continue to apply changes. The backup of the golden recovery file is maintained to allow the system to recover any other corruptions that may be realized before the backup system has applied the update to the golden recovery file.

Figure 7:
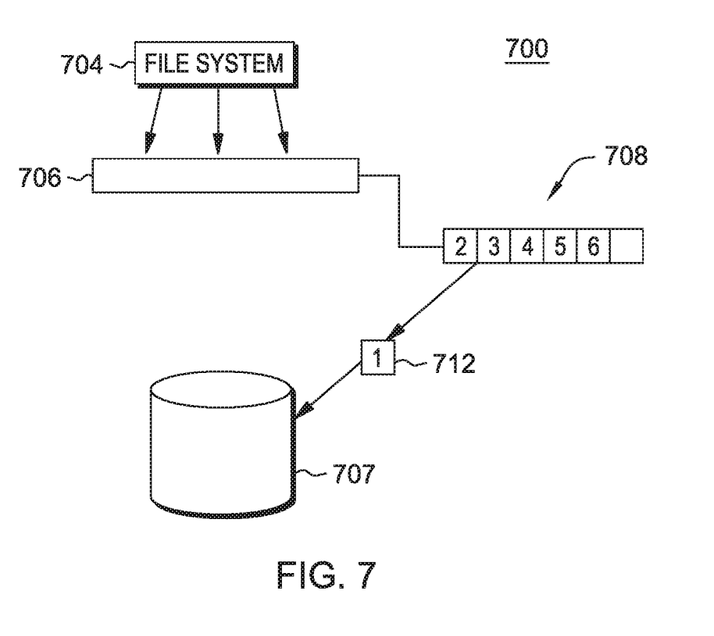
FIG. 7 is a further diagram showing journaling and backup operations according to an embodiment of the present invention.

A further embodiment of the present invention is shown in diagram 700 of FIG. 7. Similar to the embodiment of FIGS. 5A to 5E, there is a backup file system (backup file system 704), a backup version of a first file (backup version 706) and a journal of updates having unexpired batch windows (journal 708). However, in this embodiment, and unlike the embodiment of FIGS. 5A to 5E, when a journal entry has expired its batch window (as has update 1, reference numeral 712 in diagram 700), this embodiment will pass the journal entry through a corruption detection tool (antivirus module 707). If the entry is found to not have a known corruption signature, the entry will be applied to the backup file systems version of the file.

On the other hand, if an update is found to be corrupted then this embodiment will perform the following actions: (i) discard the corrupted update; (ii) make a flash copy of the current version of the file on the backup file system; (iii) alert the source file system that the file was corrupted; (iv) apply the flash copy of the file to the source cluster; (v) note the time of this update; and (vi) as new journal updates are scheduled to be applied to the file on the backup file system between the point in time when the file was found to be corrupted and the entry that contains the recovery copy that was applied to the source file system, the backup file system will ignore these updates. When the golden recovery copy update is scheduled, the system will start to allow for new updates to be committed to the backup file directory.

IV. Definitions

Present invention: should not be taken as an absolute indication that the subject matter described by the term "present invention" is covered by either the claims as they are filed or by the claims that may eventually issue after patent prosecution; while the term "present invention" is used to help the reader to get a general feel for which disclosures herein that are believed as maybe being new, this understanding, as indicated by use of the term "present invention", is tentative and provisional and subject to change over the course of patent prosecution as relevant information is developed and as the claims are potentially amended.

Embodiment: see definition of "present invention" above—similar cautions apply to the term "embodiment".

and/or: inclusive or; for example, A, B, "and/or" C means that at least one of A or B or C is true and applicable.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine-readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, and application-specific integrated circuit (ASIC) based devices.

Data set: includes, but is not necessarily limited to, a set of data in the form of one, or more, file(s).

Dynamic source data set: is a source data set (for example, a file) that is subject to being changed over time; these changes may respectively be converted into journal entries for backing up the source data set as a backup data set.

Corrupted journal entry: a journal entry that will corrupt a data set when implemented to update the data set.

Bad signatures: any signature detectable in a set of data that indicates virus, malware, corruption, or any other undesirable condition.

What is claimed is:

1. A computer program product comprising a non-transient computer readable storage medium made of matter and having stored thereon:
   first program instructions programmed to receive a first incremental mirror data set that reflects a backup data set for a plurality of journal entries which are time-ordered and generated by incrementally backing up a dynamic source file, with the first incremental mirror data set including all journal entries up to, but not including a first corrupted journal entry, which is the earliest in time journal entry, of the plurality of journal entries, which is corrupted;
   second program instructions programmed to receive a determination that the first incremental mirror data set is a most up to date set which: (i) is uncorrupted, and (ii) can be constructed from the backup data set and the plurality of journal entries; and
   third program instructions programmed to replace a source file data set with the first incremental mirror data set.

2. The product of claim 1 wherein the medium has further stored thereon:
   fourth program instructions programmed to prior to the replacing operation, send the first incremental mirror data set to a location of the source file data set.

3. A computer system comprising:
   a processor(s) set; and
   a computer readable storage medium;
   wherein:
   the processor set is structured, located, connected and/or programmed to run program instructions stored on the computer readable storage medium; and
   the program instructions include:
     first program instructions programmed to receive a first incremental mirror data set that reflects a backup data set for a plurality of journal entries which are time-ordered and generated by incrementally backing up a dynamic source file, with the first incremental mirror data set including all journal entries up to, but not including a first corrupted journal entry, which is the earliest in time journal entry, of the plurality of journal entries, which is corrupted,
     second program instructions programmed to receive a determination that the first incremental mirror data set is a most up to date set which: (i) is uncorrupted, and (ii) can be constructed from the backup data set and the plurality of journal entries, and
     third program instructions programmed to replace a source file data set with the first incremental mirror data set.

4. The system of claim 3 wherein the medium has further stored thereon:
   fourth program instructions programmed to prior to the replacing operation, send the first incremental mirror data set to a location of the source file data set.

5. A computer implemented method (CIM) comprising:
   receiving a first incremental mirror data set that reflects a backup data set for a plurality of journal entries which are time ordered and generated by incrementally backing up a dynamic source file, with the first incremental mirror data set including all journal entries up to, but not including a first corrupted journal entry, which is the earliest in time journal entry, of the plurality of journal entries, which is corrupted;

receiving a determination that the first incremental mirror data set is a most up to date set which: (i) is uncorrupted, and (ii) can be constructed from the backup data set and the plurality of journal entries; and replacing a source file data set with the first incremental mirror data set.

6. The CIM of claim 5 further comprising:

prior to the replacing, sending the first incremental mirror data set to a location of the source file data set.

\* \* \* \* \*